(12) United States Patent
Labrie et al.

(10) Patent No.: US 12,299,812 B2
(45) Date of Patent: May 13, 2025

(54) SYSTEMS AND METHODS FOR IMPROVING PROPERTY INSPECTION EFFICIENCY

(71) Applicant: ACCURENCE, INC., Louisville, CO (US)

(72) Inventors: Zachary Labrie, Broomfield, CO (US); Benjamin Zamora, Arvada, CO (US); Timothy Bruffey, Buena Vista, CO (US)

(73) Assignee: ACCURENCE, INC., Louisville, CO (US)

( * ) Notice: Subject to any disclaimer, the term of this patent is extended or adjusted under 35 U.S.C. 154(b) by 120 days.

(21) Appl. No.: 17/895,600

(22) Filed: Aug. 25, 2022

(65) Prior Publication Data
US 2022/0406009 A1 Dec. 22, 2022

Related U.S. Application Data

(63) Continuation of application No. 17/020,084, filed on Sep. 14, 2020, now Pat. No. 11,481,968, which is a
(Continued)

(51) Int. Cl.
*G06Q 50/16* (2024.01)
*G06N 20/00* (2019.01)
(Continued)

(52) U.S. Cl.
CPC ............. *G06T 17/00* (2013.01); *G06N 20/00* (2019.01); *G06Q 10/10* (2013.01); *G06Q 10/20* (2013.01);
(Continued)

(58) Field of Classification Search
CPC .................. G06T 17/00; G06T 7/0002; G06T 2207/10016; G06T 2207/10028;
(Continued)

(56) References Cited

U.S. PATENT DOCUMENTS 5,189,606 A 2/1993 Burns et al.
5,557,515 A 9/1996 Abbruzzese et al.
(Continued)

FOREIGN PATENT DOCUMENTS

JP 2005-250719 9/2005
WO WO 2014/088892 6/2014

OTHER PUBLICATIONS

"Celerant's Retail Software Streamlines Rebate Management with Benjamin Moore ™, " PR Newswire, Mar. 4, 2020, 2 pages.
(Continued)

*Primary Examiner* — Sheela C Chawan
(74) *Attorney, Agent, or Firm* — Sheridan Ross P.C.

(57) ABSTRACT

Methods and systems for automating the management and processing of roof damage analysis. In some embodiments, methods and systems include obtaining data associated with a property. Methods and systems include using obtained data to generate a model of the property. Methods and systems include transmitting the model of the property to a user device. Methods and systems include receiving annotation data from the user device. Methods and systems include generating an estimate scope of repair for the property based on the annotation data.

20 Claims, 6 Drawing Sheets

Related U.S. Application Data continuation-in-part of application No. 16/208,113, filed on Dec. 3, 2018, now Pat. No. 10,776,883, which is a continuation-in-part of application No. 15/445,509, filed on Feb. 28, 2017, now Pat. No. 10,181,079.

(60) Provisional application No. 62/301,411, filed on Feb. 29, 2016.

(51) Int. Cl.
| | |
|---|---|
| *G06Q 10/10* | (2023.01) |
| *G06Q 10/20* | (2023.01) |
| *G06Q 40/08* | (2012.01) |
| *G06T 7/00* | (2017.01) |
| *G06T 17/00* | (2006.01) |

(52) U.S. Cl.
CPC ............. *G06Q 40/08* (2013.01); *G06Q 50/16* (2013.01); *G06T 7/0002* (2013.01); *G06T 2207/10016* (2013.01); *G06T 2207/10028* (2013.01)

(58) Field of Classification Search
CPC .... G06T 2210/04; G06N 20/00; G06Q 10/10; G06Q 10/20; G06Q 40/08; G06Q 50/16; G06V 2201/06; G06V 20/176
USPC .......................................... 345/419; 382/100
See application file for complete search history.

(56) References Cited

U.S. PATENT DOCUMENTS

| | | | |
|---|---|---|---|
| 6,037,945 | A | 3/2000 | Loveland |
| 6,810,383 | B1 | 10/2004 | Loveland |
| 6,816,819 | B1 | 11/2004 | Loveland |
| 6,826,539 | B2 | 11/2004 | Loveland |
| 6,829,584 | B2 | 12/2004 | Loveland |
| 6,859,768 | B1 | 2/2005 | Wakelam et al. |
| 7,333,944 | B1 | 2/2008 | Harris |
| 7,389,255 | B2 | 6/2008 | Formisano |
| 7,747,460 | B2 | 6/2010 | Vandrilla |
| 7,844,503 | B2 | 11/2010 | Fogelson |
| 8,078,436 | B2 | 12/2011 | Pershing et al. |
| 8,145,578 | B2 | 3/2012 | Pershing et al. |
| 8,170,840 | B2 | 5/2012 | Pershing |
| 8,209,152 | B2 | 6/2012 | Pershing |
| 8,249,999 | B2 | 8/2012 | Dakar et al. |
| 8,265,963 | B1 | 9/2012 | Hanson et al. |
| 8,401,222 | B2 | 3/2013 | Thornberry et al. |
| 8,670,961 | B2 | 3/2014 | Pershing et al. |
| 8,731,234 | B1 | 5/2014 | Ciarcia et al. |
| 8,756,085 | B1 | 6/2014 | Plummer et al. |
| 8,983,806 | B2 | 3/2015 | Labrie et al. |
| 9,158,869 | B2 | 10/2015 | Labrie et al. |
| 9,609,288 | B1 | 3/2017 | Richman et al. |
| 9,721,264 | B2 | 8/2017 | Labrie et al. |
| 10,181,079 | B2 | 1/2019 | Labrie et al. |
| 10,204,193 | B2 | 2/2019 | Koger et al. |
| 10,373,256 | B1 | 8/2019 | Allen et al. |
| 10,552,913 | B1 | 2/2020 | Brandmaier et al. |
| 10,740,770 | B2 | 8/2020 | Labrie et al. |
| 10,776,883 | B2 | 9/2020 | Labrie et al. |
| 10,796,149 | B2 | 10/2020 | Labrie et al. |
| 10,861,099 | B2 | 12/2020 | Bruffey et al. |
| 11,210,741 | B1 | 12/2021 | Allen et al. |
| 11,392,977 | B2 | 7/2022 | Bruffey et al. |
| 11,481,968 | B2 | 10/2022 | Labrie et al. |
| 2002/0087332 | A1 | 7/2002 | Como |
| 2004/0243423 | A1 | 12/2004 | Rix et al. |
| 2005/0102394 | A1 | 5/2005 | Loveland |
| 2008/0263562 | A1 | 10/2008 | Serwitz |
| 2009/0216552 | A1 | 8/2009 | Watrous |
| 2009/0234690 | A1 | 9/2009 | Nikipelo |
| 2009/0265193 | A1* | 10/2009 | Collins ............. G06Q 30/0185 901/46 |
| 2010/0110074 | A1 | 5/2010 | Pershing |
| 2010/0235206 | A1 | 9/2010 | Miller et al. |
| 2010/0332355 | A1 | 12/2010 | Lopez et al. |
| 2012/0296774 | A1 | 11/2012 | Littooy et al. |
| 2013/0144715 | A1 | 6/2013 | Kranzley et al. |
| 2013/0144746 | A1 | 6/2013 | Phung |
| 2013/0262029 | A1 | 10/2013 | Pershing |
| 2013/0282511 | A1 | 10/2013 | Mitchell et al. |
| 2013/0346020 | A1 | 12/2013 | Pershing |
| 2015/0170288 | A1 | 6/2015 | Harton et al. |
| 2015/0227893 | A1 | 8/2015 | Huynh et al. |
| 2015/0348204 | A1 | 12/2015 | Daues |
| 2016/0307447 | A1 | 10/2016 | Johnson et al. |
| 2017/0132711 | A1 | 5/2017 | Bruffey et al. |
| 2017/0270612 | A1 | 9/2017 | Howe et al. |
| 2017/0330364 | A1 | 11/2017 | Yamamoto et al. |
| 2017/0345069 | A1 | 11/2017 | Labrie et al. |
| 2019/0340692 | A1 | 11/2019 | Labrie et al. |
| 2022/0261840 | A1 | 8/2022 | Bruffey et al. |
| 2023/0019362 | A1 | 1/2023 | Bruffey et al. |

OTHER PUBLICATIONS

"ImproveNet's Two-Stage Pricing Wizard Makes It Easy to Calculate Roofing Costs; Dual Views Offer Tradeoffs Between Speed, Precision," Business Wire, 2000, 6 pages.

Official Action for U.S. Appl. No. 13/336,559, mailed Apr. 15, 2014, 9 pages.

Notice of Allowance for U.S. Appl. No. 13/336,559, mailed Dec. 5, 2014, 8 pages.

Official Action for U.S. Appl. No. 13/542,541, mailed May 23, 2014, 10 pages.

Final Action for U.S. Appl. No. 13/542,541, mailed Jan. 28, 2015, 11 pages.

Notice of Allowance for U.S. Appl. No. 13/542,541, mailed Aug. 5, 2015, 8 pages.

Notice of Allowance for U.S. Appl. No. 14/540,886, mailed Mar. 28, 2017, 10 pages.

Official Action for U.S. Appl. No. 15/663,518, dated Dec. 20, 2019 12 pages.

Notice of Allowance for U.S. Appl. No. 15/663,518, dated Apr. 8, 2020 8 pages.

Official Action for U.S. Appl. No. 15/345,071, dated Aug. 22, 2019 8 pages.

Official Action for U.S. Appl. No. 15/345,071, dated Apr. 3, 2020 10 pages.

Official Action for U.S. Appl. No. 15/345,071, dated Nov. 3, 2020 13 pages.

Official Action for U.S. Appl. No. 15/345,071, dated Apr. 15, 2021 12 pages.

Official Action for U.S. Appl. No. 15/345,071, dated Oct. 6, 2021 13 pages.

Official Action for U.S. Appl. No. 15/345,071, dated May 12, 2022 14 pages.

Official Action for U.S. Appl. No. 14/968,574, mailed Jan. 3, 2017, 28 pages.

Final Action for U.S. Appl. No. 14/968,574, mailed Aug. 28, 2017, 34 pages.

Official Action for U.S. Appl. No. 14/968,574, mailed May 1, 2018, 39 pages.

Final Action for U.S. Appl. No. 14/968,574, mailed Feb. 8, 2019, 42 pages.

Official Action for U.S. Appl. No. 14/968,574, dated Sep. 19, 2019 41 pages.

Official Action for U.S. Appl. No. 14/968,574, dated Apr. 2, 2020 37 pages.

Notice of Allowance for U.S. Appl. No. 14/968,574, dated Aug. 5, 2020 9 pages.

Official Action for U.S. Appl. No. 15/214,877, mailed Mar. 22, 2019, 8 pages.

Official Action for U.S. Appl. No. 15/214,877, dated Sep. 27, 2019 15 pages.

(56) References Cited

OTHER PUBLICATIONS

Official Action for U.S. Appl. No. 15/214,877, dated May 17, 2021 11 pages.
Notice of Allowance for U.S. Appl. No. 15/214,877, dated Feb. 2, 2022 10 pages.
Official Action for U.S. Appl. No. 15/445,509, dated May 10, 2018, 14 pages.
Notice of Allowance for U.S. Appl. No. 15/445,509, dated Nov. 5, 2018 10 pages.
Official Action for U.S. Appl. No. 16/245,506, dated Nov. 29, 2019 9 pages.
Notice of Allowance for U.S. Appl. No. 16/245,506, dated May 28, 2020 8 pages.
Official Action for U.S. Appl. No. 16/208,113, dated Nov. 18, 2019 10 pages.
Notice of Allowance for U.S. Appl. No. 16/208,113, dated May 5, 2020 11 pages.
Corrected Notice of Allowance for U.S. Appl. No. 16/208,113, dated Jul. 2, 2020 7 pages.
Official Action for U.S. Appl. No. 17/020,084, dated Feb. 3, 2022 14 pages.
Notice of Allowance for U.S. Appl. No. 17/020,084, dated Jun. 15, 2022 9 pages.
Official Action for U.S. Appl. No. 15/606,475, dated Jan. 6, 2020 30 pages.
Official Action for U.S. Appl. No. 15/606,475, dated Mar. 20, 2020 33 pages.
Examiner's Answer for U.S. Appl. No. 15/606,475, dated Dec. 28, 2020 38 pages.
Decision on Appeal for U.S. Appl. No. 15/606,475, dated Feb. 8, 2022 25 pages.
Official Action for U.S. Appl. No. 15/606,475, dated May 26, 2022 36 pages.
Official Action for U.S. Appl. No. 15/970,484, dated Mar. 19, 2020 25 pages.
Official Action for U.S. Appl. No. 15/970,484, dated Dec. 28, 2020 31 pages.
Official Action for U.S. Appl. No. 15/970,484, dated Apr. 30, 2021 40 pages.
Official Action for U.S. Appl. No. 15/970,484, dated Jan. 7, 2022 39 pages.
Official Action for U.S. Appl. No. 15/970,484, dated May 24, 2022 38 pages.
Official Action for U.S. Appl. No. 15/970,484, dated Dec. 15, 2022 18 pages.
Official Action for U.S. Appl. No. 15/606,475, dated Sep. 22, 2022 42 pages.
Official Action for U.S. Appl. No. 15/606,475, dated Dec. 8, 2022 37 pages.
Official Action for U.S. Appl. No. 15/606,475, dated Jun. 16, 2023 17 pages.
Official Action for U.S. Appl. No. 15/970,484, dated Apr. 28, 2023 18 pages.
Official Action for U.S. Appl. No. 15/970,484, dated Aug. 17, 2023 19 pages.
Official Action for U.S. Appl. No. 15/606,475, dated Dec. 7, 2023 21 pages.
Official Action for U.S. Appl. No. 15/970,484, dated Dec. 13, 2023 18 pages.
U.S. Appl. No. 13/336,559, filed Dec. 23, 2011 now U.S. Pat. No. 8,983,806.
U.S. Appl. No. 13/542,541, filed Jul. 5, 2012 now U.S. Pat. No. 9,158,869.
U.S. Appl. No. 14/540,886, filed Nov. 13, 2014 now U.S. Pat. No. 9,721,264.
U.S. Appl. No. 15/663,518, filed Jul. 28, 2017 now U.S. Pat. No. 10,740,770.
U.S. Appl. No. 15/345,071, filed Nov. 7, 2016.
U.S. Appl. No. 17/953,928, filed Sep. 27, 2022.
U.S. Appl. No. 14/968,574, filed Dec. 14, 2015 now U.S. Pat. No. 10,861,099.
U.S. Appl. No. 15/214,877, filed Jul. 20, 2016 now U.S. Pat. No. 11,392,977.
U.S. Appl. No. 17/735,328, filed May 3, 2022.
U.S. Appl. No. 15/445,509, filed Feb. 28, 2017 now U.S. Pat. No. 10,181,079.
U.S. Appl. No. 16/208,113, filed Dec. 3, 2018 now U.S. Pat. No. 10,776,883.
U.S. Appl. No. 17/020,084, filed Sep. 14, 2020 now U.S. Pat. No. 11,481,968.
U.S. Appl. No. 16/245,506, filed Jan. 11, 2019 now U.S. Pat. No. 10,796,149.
U.S. Appl. No. 15/606,475, filed May 26, 2017.
U.S. Appl. No. 15/970,484, filed May 3, 2018 now.
Official Action for U.S. Appl. No. 17/953,928, dated May 24, 2024 9 pages.
Official Action for U.S. Appl. No. 17/735,328, dated Dec. 21, 2023 19 pages.
Official Action for U.S. Appl. No. 17/735,328, dated Jun. 21, 2024 12 pages.
Official Action for U.S. Appl. No. 15/970,484, dated Mar. 21, 2024 19 pages.

* cited by examiner

SYSTEMS AND METHODS FOR IMPROVING PROPERTY INSPECTION EFFICIENCY

CROSS-REFERENCE TO RELATED APPLICATIONS

This application is a continuation and claims the benefit of U.S. application Ser. No. 17/020,084, filed Sep. 14, 2020, which is a continuation-in-part and claims the benefit of U.S. application Ser. No. 16/208,113, filed Dec. 3, 2018, which is a continuation-in-part and claims the benefit of U.S. application Ser. No. 15/445,509, filed Feb. 28, 2017, which claims the benefit of U.S. Provisional Application No. 62/301,411, filed Feb. 29, 2016, the entire disclosure of each of which is hereby incorporated herein by reference.

TECHNICAL FIELD

The present disclosure is directed generally toward property damage recognition systems and methods and more particularly toward systems and methods for utilizing video and/or still images to analyze types of damage to property.

BACKGROUND

Homes and commercial buildings may experience damage or otherwise be negatively impacted due to fires, earthquakes, tornados, flooding, and other disasters. Such disasters may be of natural causes, or they may result from mechanical failure, human error, or any number of other non-natural causes. As an example, flooding may result from a wide variety of natural conditions, including excessive rain, storm surges, or rapid melting of snow or ice. Additionally, freezing temperatures may cause the water inside water pipes to freeze, expand and burst the pipes. Water hoses may be become disconnected or may become brittle and break. Sinks and commodes may overflow from clogged pipes. As another example, fire can result from natural causes, such as lightning strikes, or it can result from human-related causes, such as a gas leak resulting in gas buildup, ignition and "puff back"; a stove or oven that becomes excessively hot; an overloaded electrical circuit; or a curling iron left in close proximity to a flammable material. The cause of damage to property may come from any number of sources and the damage caused to the property typically varies greatly with each and every cause in any number of ways related to the scope and magnitude of the damage.

The damage caused by water, fire, hail or other disasters is rarely easy to identify, or even limited to the area where the mishap occurred. For example, hail may damage a roof in places which are difficult to view and/or access. As a second example, a pipe may suffer a break that is confined to a particular location, but broken pipes often lead to flooding, which may be widespread throughout an entire structure and the scope of such flooding may be impossible to determine during simple inspection. Likewise, even though a fire may be contained to a particular room or location in a building, it may cause smoke damage throughout the entire building or even adjacent buildings in places not easily accessible. Moreover, the building may suffer water damage and/or other types of damage as a result of efforts to extinguish the fire. Such damage may affect the structure of a property in ways that are impossible to determine without extensive testing or, in some cases, actual demolition of the property.

When a damaged structure is insured, the first step in disaster mitigation and restoration often involves notifying the insurance company of the damage or loss. The insurance company then typically dispatches a person, e.g. a vendor or adjuster, to physically and personally visit the damaged location to assess the loss and write an initial mitigation estimate that addresses the initial loss and any secondary damages. Alternatively, the insured party may call a vendor directly, personally provide a description of the damage to receive an initial mitigation estimate from the vendor, and then contact the insurance company.

Methods of inspecting property damage typically also require physical presence of an analyst on or near the damaged building. Such methods limit the analysis to buildings which the analyst or inspection company has obtained permission to inspect. In many cases, however, damage caused by nature, e.g. hail or high-winds, is widespread and far-reaching across city blocks, neighborhoods, towns and counties. For an insurance or inspection company to obtain permission to physically access each and every damaged property after a storm may require an exhausting, time-consuming and expensive process.

Also, an owner of a damaged property or an insurance company may need estimates from a number of repair companies in order to generate an estimate of damage to the property. Each repair company, in order to supply its own estimate or bid for cost of repairing the property may need its own analyst to physically visit the property. As such, one estimate to one damaged property may require a multitude of analysts from different repair companies each visiting and analyzing the property. In the case of widespread damage across even one neighborhood after a storm a proper analysis of the damage would require an enormously time-consuming and expensive process before an estimate can be generated. These expenses and time delays add up and add a great deal of economic waste with each individual property damaged.

Accuracy of damage estimates relies on accurate analysis. Analysis accuracy and techniques may also vary between analysts making it difficult and/or impossible to set industry-wide standards.

In today's world, due to a human not being efficient at looking at the entire roof for hail damage, most insurance adjusters take a representative sample to determine if there is hail damage for a directional slope on the roof. This is not always representative of the entire condition of a directional slope on the roof.

BRIEF DESCRIPTION OF THE DRAWINGS

For a more complete understanding of the present disclosure and its advantages, reference is now made to the following description taken in conjunction with the accompanying drawings, in which like reference numerals represent like parts.

SUMMARY

Figure 1:
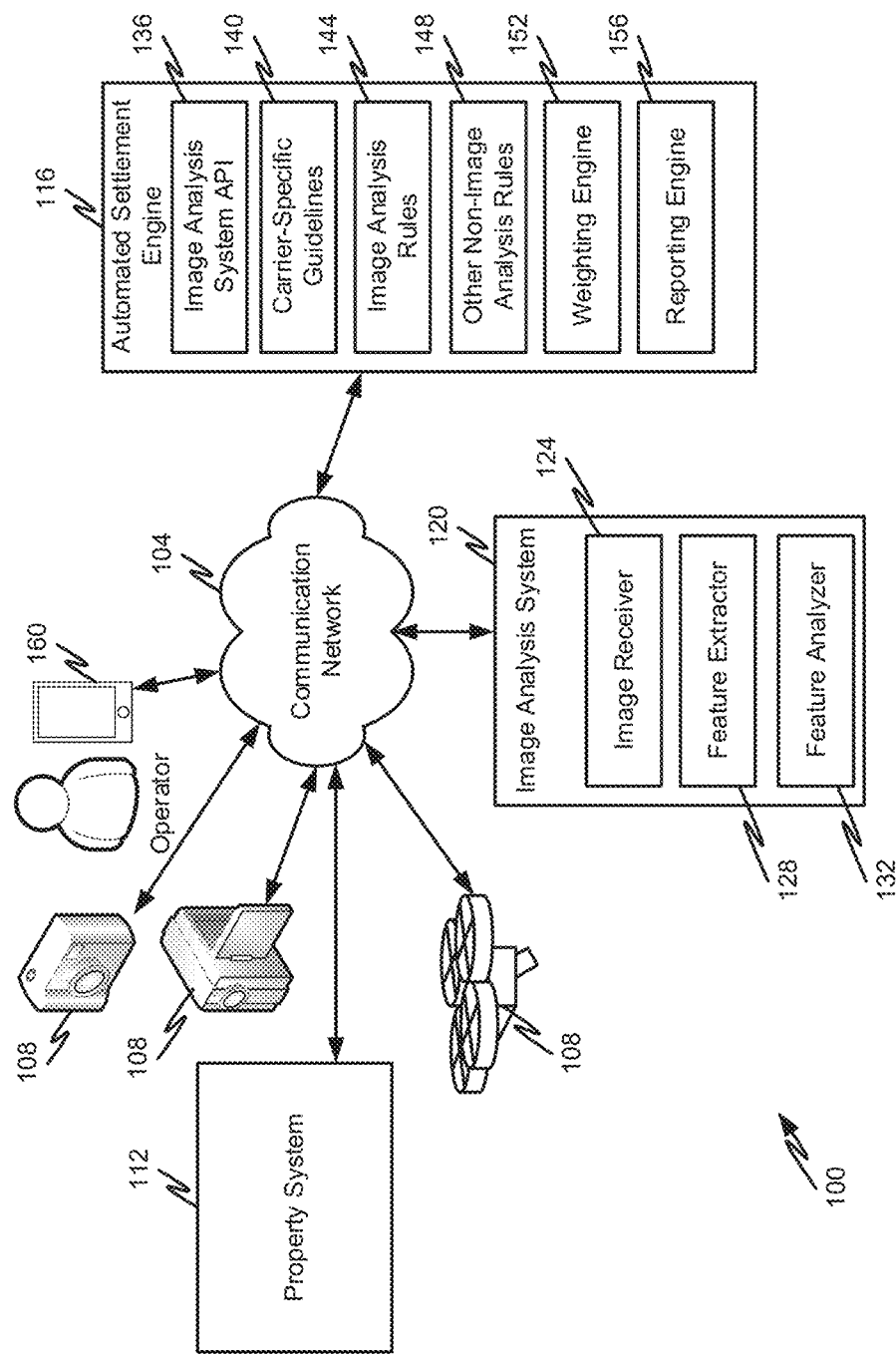
FIG. 1 illustrates a hardware block diagram of an exemplary system for performing video or still image analysis on building structures in accordance with embodiments described herein.

It is with respect to the issues and other problems presently faced by those of skill in the relevant art and described above that the embodiments presented herein are contemplated. What is needed is a property damage analysis system which (1) is automated or otherwise does not require a human analyst to scale a damaged building, (2) is efficient and not time-consuming, (3) is reliable and provides accurate, standardized analysis, and (4) is capable of analyzing damage in difficult to access areas.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Hereinafter, "in communication" shall mean any electrical connection, whether wireless or wired, that allows two or more systems, components, modules, devices, etc. to exchange data, signals, or other information using any protocol or format.

The terms "determine," "calculate," and "compute," and variations thereof, as used herein, are used interchangeably and include any type of methodology, process, mathematical operation or technique.

Various embodiments of the present disclosure describe a system with the ability to employ a machine to analyze damage to property in a number of ways. For example, embodiments of the present disclosure present a system capable of identifying probable hail damage. Embodiments may include systems capable of identifying locations of identified probable hail damage. Embodiments may also include systems capable of identifying whether or not an entire roof has been subjected to hail damage. Embodiments may include systems which determine such information regarding roof damage through the analysis of video and/or still-images of the roof. It should be appreciated that as processing speeds and technology for video and images are increased and automated, an automated solution could be highly cost effective and much safer than having a human climb a roof to personally inspect the roof.

Embodiments presented herein further disclose a system comprising: an image receiver that receives one or more original roof images; a feature extractor that is used to identify features and corresponding locations of the identified features from the one or more original roof images or a processed version thereof; a feature analyzer that generates a feature list describing the identified features and the corresponding locations of the identified features in a format that is deliverable to an automated settlement engine. According to this embodiment, the automated settlement engine comprises: an image analysis system Application Programming Interface (API) configured to receive the feature list from the image analysis system; and, a set of image analysis rules that are configured to analyze the identified features from the feature list along with the corresponding locations of the identified features to determine whether or not damage occurred to a property with respect to a predetermined likelihood.

Embodiments presented herein further disclose a system comprising: an image receiver tool that receives one or more original images; an extractor tool that identifies one or more features and their corresponding locations; an analyzer tool that processes the information obtained by the extractor tool and delivers the one or more identified features and their corresponding locations to an automated settlement engine; an annotation tool that allows one or more features to be marked or further described by a user; wherein the automated settlement engine applies one or more rules configured to determine whether sufficient damage occurred; wherein when the application of the one or more rules dictate that damage occurred with a probability greater than the predetermined likelihood, then the system generates a report that indicates damage has occurred and identifies the corresponding locations subject to insurance coverage and reimbursement; and wherein when the application of the one or more rules dictate that damage occurred with a probability less than the predetermined likelihood, then the system generates a report that indicates a manual inspection of the property is needed.

Embodiments of the present disclosure are further capable of considering or suggesting a manual inspection for information from additional out of the line of site characteristics (e.g., the underside of the shingle mat is fractured, and considering damages to soft metals and plastics). Considerations of this additional information not obtained from video and/or still images can be used to weight a probability score as to whether or not the roof actually experienced hail damage in a particular location or along its entirety. Embodiments of the present disclosure could also weigh these factors (e.g., video/still image information along with additional information not obtained from video and/or still images).

In some embodiments, each carrier represented in a settlement guideline engine could set their probability algorithm (scores) based on these attributes, meaning that each insurance carrier could define different weighting algorithms and/or identify which features should be considered or not considered by the automated process that analyzes roof damage for specific markers of hail damage. The system could be configured to consume photos or video to make these assessments.

Other system features include bookmarking components of the video, tagging potential marks, ongoing learning based on human review of these marks, insurance carrier specific learning for what their teams accept as hail that are unique overtime building out acceptable images. The system can also create a digital test square which is the method carriers use today which can be superimposed or "slid" over the roof slope to analyze damage, such as hail count changes, within the test square area, which may vary based on the location. The manufacturer data for the specific shingle may be derived and taken into account to assist the machine better predict the likelihood that an anomaly is or is not a hail strike. Methods on analyzing layers and patterns within known manufacturer shingle granular spray patterns, grains per inch based on slope exposure (north versus south/tree coverage/etc.) as well as age, oxidation (age of bruise), filtering images for organic matter (lichen patterns), and other characteristics would be leveraged to help set probabilities of hail damage versus non-hail damage. In particular, additional layers of shingles drastically increase the probability of damage due to the lack of a solid surface under the shingles. Furthermore, roof pitch is also a factor due to the angle of hail impact and may affect the shape of the hail damage pattern.

Further embodiments may also consider weather reports and storm directionality as both weather reports and directionality of the storm provide good indications of what will be seen.

Incorporated by reference in their entireties are the following U.S. patents and patent applications directed generally to the relevant art, and identified for the purpose of supplementing the written description for various aspects of the present disclosure. The U.S. patents and pending applications incorporated by reference are as follows: U.S. Pat. Nos. 8,983,806, 9,158,869 and U.S. Pat. Pub. Nos. 2016/0098802.

The preceding is a simplified summary to provide an understanding of some aspects of the embodiments. This summary is neither an extensive nor exhaustive overview of the various embodiments. It is intended neither to identify key or critical elements nor to delineate the scope of the embodiments but to present selected concepts in a simplified form as an introduction to the more detailed description presented below. As will be appreciated, other embodiments are possible utilizing, alone or in combination, one or more of the features set forth above or described in detail below.

DESCRIPTION OF EMBODIMENTS

The ensuing description provides embodiments only and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Embodiments of the present disclosure may be better understood with reference to FIGS. 1-6. Referring first to FIG. 1, an illustrative communication system 100 will be described in accordance with at least some embodiments of the present disclosure. The communication system 100 of FIG. 1 may be a distributed system and, in some embodiments, comprises a communication network 104 connecting one or more image capture devices 108 (e.g., cameras, automated cameras/drones, smartphones equipped with cameras, video cameras, etc.) to an image analysis system 120 and automated settlement engine 116. While the discussion herein is primarily directed to surveying damage to roofs, it should be appreciated that damage to any property may be surveyed in similar ways. Nothing in this disclosure is intended as being limited to surveying solely roof damage.

The communication system 100 may in some embodiments include one or more property systems 112. Each property system 112 may comprise a piece of real property such as a house, garage, or other building, or may comprise one or more pieces of fixtures associated with a piece of real property, such as a roof, ceiling, wall, floor, air conditioner, furnace, etc. In some embodiments, a property system 112 may comprise one or more pieces of physical property such as an entertainment system, furniture, etc. In some embodiments, a property system 112 may comprise a combination of real property, fixtures, and physical property. A property system 112 may be associated with one or more insurance policies.

A property system 112 may be equipped with one or more sensors. Sensors may be capable of communicating with network devices via a communication network 104. By utilizing sensors within a property system 112, one or more methods and systems of automatically analyzing images may be achieved. For example, an artificial intelligence ("AI") system may be capable of using data from a sensor or any type of computing device to recognize evidence of damage to a property. Sensors may be, for example, pressure and/or noise sensors on or near a roof of a property system 112. The sensors may send data to a server executing an AI system. Using data from the sensors, the AI system may be capable of recognizing evidence of hail. Throughout the life of the AI system, the AI system may use hail-related data to update its hail hit recognition capabilities. In this way, the AI system may be capable of determining a probability of whether hail damage has occurred.

Such a system may improve the efficiency of an automated insurance system in the aftermath of a widespread disaster such as a tornado, hurricane, or hailstorm. For example, if the AI system shows a high degree of confidence that the data received from the sensors is a result of hail, then the insurance company may be able to accept a higher settlement amount without being required to physically review the property damage. This automation may greatly reduce the amount of time needed to respond to thousands and thousands of claims following a natural disaster, allowing homeowners to carry on with their lives.

An AI system may use data from sensors associated with a property system 112 to be capable of identifying objects requiring replacement and/or repair. For example, objects such as: a fence, gutters, shingles, air conditioning unit, etc. Data received from sensors associated with such objects may be used by an AI system to enable the AI system to recognize features indicating an event has occurred. An AI system may then be capable of identifying whether an event has occurred, what the damage is, and whether anything should be replaced or repaired.

For example, sensors may comprise impact sensors on top of a roof, sound sensors inside an attic (looking for a sound signature of hail sound), sound sensors elsewhere, impact sensors, image sensors, stereoscopic views (with multiple images from different angles), different frequency image sensors (e.g., IR sensors, etc.), etc. Any such sensors would build outputs from a property system 112 that may be used as an input to an AI system.

An AI system may in some embodiments use simple images of non-roof assets and elevations of the house/asset as an initial input to the AI system. Such images may be taken by a homeowner or other person using a user device 160. Images may be associated with metadata related to details regarding each image, such as which direction each image is facing. If simple images indicate there may be or is likely damage to a part of a property system, such as a roof, then the AI system may decide closer inspection may be required and an adjuster may be sent to go up on the roof or elsewhere to survey the damage.

Such information may also or alternatively be fed into an auditing tool and then an output of the auditing tool may be what is used to retrain a damage identification model used by an AI system.

An AI system may be used to survey damage other than roof damage, for example, sensor data indicating inside damage of a flood line could enable the AI system to automatically identify fixtures, real, or physical property inside a house which may need to be replaced, repaired, and/or modified. Similarly, data indicating a fire may enable the AI system to automatically identify fixtures, real, or physical property inside a house which may need to be replaced, repaired, and/or modified. Such data may comprise sensor data, photographic data collected by a user device 160, textual data entered into a user device 160 by a user, or other data.

If any damage is identified by the AI system using such data, the AI system may prompt a user via a user device 160 for additional information on such damage assets, thus enabling a guided inspection. The AI system may automate a guided inspection and use data entered into a user device 160 by a user during a guided inspection to build a profile of information. If additional information is needed, then the AI system may send profile information to a virtual agent that may assist a homeowner with steps to complete the damage profile information.

In some cases, multiple sets of inspection data may be received by an AI system for a single property system 112. The AI system may keep track of what property is damaged in which inspection data and compare images and data sets to determine whether a piece of property has already been covered but not replaced/fixed and then make sure that damage is not covered again unnecessarily. Because some homeowners will submit a claim but not make the fix, the AI system may enable an insurance carrier to avoid paying for the same damage twice.

In some embodiments an AI system may be capable of identifying subrogation opportunities inside and outside of a house or other property system 112. For example, inside a house there may be sensors or other data relating to determining when a certain piece has broken (e.g., compression fitting, washing machine hose). If something looks like a subrogation opportunity, the AI system may prompt a user such as an adjuster to look for additional information or to ask about laborers or help identify other damage.

The AI system may be capable of automatically looking through county records or other sources of information to collect data related to possible property damage. For example, the AI system may be capable of researching and identifying issues of quality of parts or of installation and be capable of identifying any difference between the two. The AI system may further be capable of identifying a cause of origin of damage (e.g., identifying a cause of loss), as well as capable of identifying potential fraud cases. The AI system may be trained to identify whether a potential fraud case is at issue.

If identified, the AI system may be capable of simply prompting users (e.g., an everyday adjuster or homeowner rather than a specialist) with further questions to identify if an insurance claim looks like a fraud case. The AI system may compare a customer's indication of asset quality versus a guessed indication of asset quality. If they do not match or are too far apart, then the AI system could set a flag or recommend a human adjustor to go onsite.

In some embodiments, the AI system may be capable of identifying what side of a house damage occurred. For example, the AI system may have different models for different sides of the house (e.g., because the south side gets more sun and may break down easily). The AI system may also be capable of identifying how old some damage is, an age and/or condition of an object to be repaired/replaced, items which are not damaged, etc. and may be capable of building a catalog of damaged vs undamaged items.

In some embodiments, an AI system may build a damageability index and further use that in connection with determining that something is NOT damaged. The AI system may be capable of identifying materials, storm data, asset data, damage data, sensor data, etc. An AI system may also be capable of determining the quality of materials in an automated fashion (look for subrogation or fraud, do not just look for quality)?

In some embodiments, the system may include one or more data capture devices 108. A data capture device 108 may be in some embodiments a handheld still image or video camera. In some embodiments, the data capture device may be a smartphone or tablet or some other personal computing device with a camera. In some embodiments, the data capture device may be controlled and operated by a human operator either directly and/or physically by a handheld device 108 or remotely through the use of a drone or kite or some other flying device operable to capture images or video. In some embodiments, the data may be collected automatically by a drone flying in an automatic pattern while recording or taking photographs automatically.

Data collected by the data collector(s) 108 may be in the form of still photographs or video. Images or video may be collected by a handheld camera or by a drone carrying a camera or by a camera-equipped kite or other type of aerial photography mechanism. The images may be taken directly overhead or from an angle. The photos or videos may be taken by a camera capable of capturing hyper-spectral images, infrared or thermal images and/or a common camera forming an image using visible light.

In some embodiments, LiDAR, or other technology, may be used to gather data associated with an insured property. Data collected using LiDAR or other technology may be in the form of laser return times and wavelengths and may be used to create a three-dimensional representation of the insured property. LiDAR or other technology data may be of an exterior of a property or an interior of the property.

In some embodiments, users may be guided through a process of obtaining photographs of a property from various angles. For example, an application executing on a user device may instruct a user to take a first photograph from a first angle of a property and a second photograph from a second angle of the property. In this way, the system may be capable of ensuring a proper amount of visual data of the property has been obtained.

Using a system of guiding users through a process of acquiring a proper amount of visual data may enable on-the-ground inspectors to add a description of the material damage as seen from the location of the property as opposed to data acquired from a distance. For example, inspectors may add a description of types of shingles, whether a roof contains vents, etc.

In some embodiments, one or more sensors may be used to collect data associated with a property. For example, impact sensors may be placed on a roof, sound sensors may be placed in an attic or another area capable of detecting impact on a roof, impact sensors, stereoscopic viewing sensors, frequency image sensors (e.g., IR sensors, etc.), etc. Sound sensors may be capable of detecting sound signatures of hail hitting the roof.

Data collected may be stored on a local memory device, e.g. onboard the camera, or transmitted to a secondary local device, e.g. a laptop. For example, a data collection device 108 may be equipped with onboard memory or a communication device operable to transmit the data to off-board storage. Data may be tagged upon capture or at a later point with identifying information stored as metadata or at a later point with identifying information stored as metadata or a folder name structure. Identifying information may include GPS data, a timestamp, insurance plan data or other relevant information.

Data may also be live-streamed to a collecting server via a network 104. The collecting server may automatically store the received data so that it may be easily retrieved. The data may be tagged by the collecting server with identifying information or may be tagged by the collecting device prior to transmission. Data collected or stored locally may be uploaded in bulk or in portions to a server via the network 104. The data may be uploaded via the network 104 automatically or upon command from a user operator.

Data collected by the one or more data collection devices 108 may be sent to a server via the network 104. The data may be sent or transmitted via a wireless network e.g. an LTE or other high-speed wireless communication network or via a wireless internet, e.g. WIFI, connection, or by wired connection, e.g. Ethernet or cable.

In some embodiments, data associated with an insured property may be obtained from a third party. For example, roof images may be obtained from services (e.g., Eagle View™, etc.) which may be capable of providing images collected via aerial devices (e.g., planes, satellites, drones, etc.). The server may be in the control of an insurance company or may be accessible by a number of insurance companies or automated settlement engine operators. The sever may function as an image analysis system 120. In some embodiments, the system comprises an image analysis system 120. The image analysis system may comprise an image receiver, a feature extractor, and/or a feature analyzer. The image analysis system may be a function performed by one or more processors on a server or a personal-computing device. The image analysis system may accept, as input, one or more image files. The one or more image files accepted by the image analysis system may be in the form of JPEG, IMG, PNG, bitmap, or other format of image file. The image analysis system may also accept as input one or more video files. The one or more video files may be in the form of MOV, MPEG, AVI, or other format of video file. The image and/or video files may also carry data in the form of metadata or tags. Additionally or alternatively, the image and/or video files may be arranged in subsets of folders providing additional information. The additional information or metadata may include information such as address or GPS or some other location data associated with the collected image or video file, a timestamp, an operator identifier, insurance company information, and/or other information. After receiving the files, the image analysis system may use a feature extractor function to automatically determine information regarding the property system 112 associated with the captured and received images and/or video files.

In some embodiments, the image analysis system 120 and automated settlement engine 116 may be implemented in a common entity and may reside in a common enterprise network (e.g., behind a common firewall). In other embodiments, the systems 116, 120 may be implemented by different entities and/or at different enterprise networks. In some embodiments, the automated settlement engine 116 and image analysis system 120 may be implemented on a common server and that particular server may have some or all of the components of both the automated settlement engine 116 and image analysis system 120. The depiction of the image analysis system 120 as being separate from the automated settlement engine 116 is for illustrative purposes only and should not be construed as limiting the communication system to any particular configuration.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, and combinations thereof.

Figure 2:
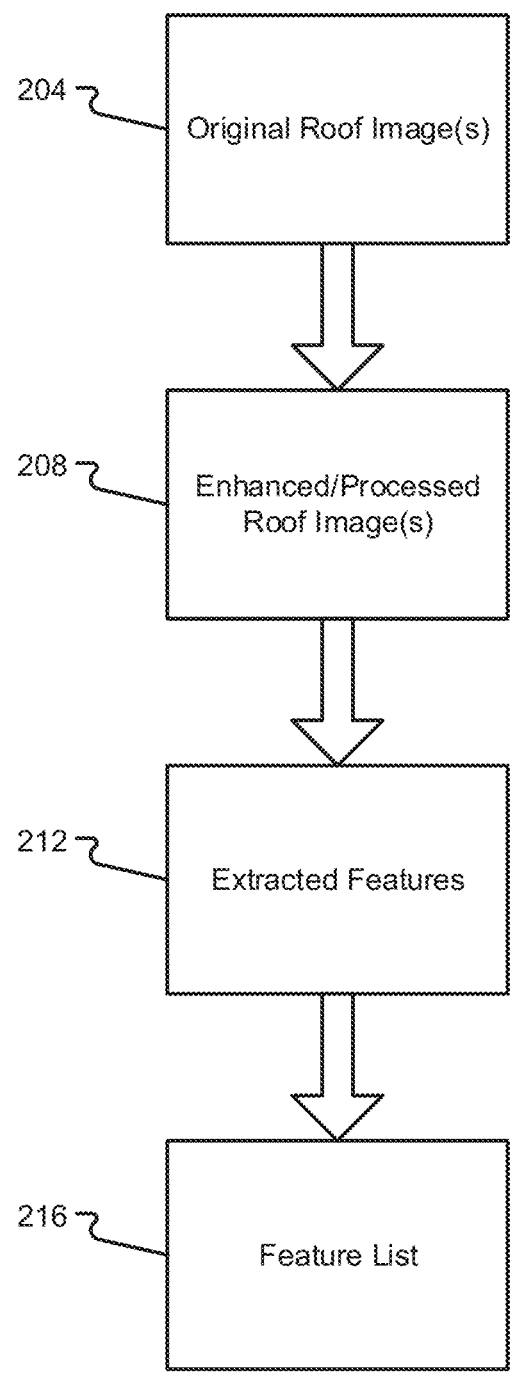
FIG. 2 is a flowchart illustrating an exemplary method of generating a feature list in accordance with embodiments described herein.

The image capture device(s) 108 may be configured to capture one or more images (still or motion) of a property system 112 and provide the images to the image analysis system 120 via the communication network 104 or some other image-delivery mechanism. As shown in FIG. 2, the images received at the image analysis system 120 correspond to original roof image(s) 204. The image analysis system 120 may employ the image receiver 124 to initially receive and store the original roof image(s) 204 from the image capture device(s) 108.

The image analysis system 120 may then utilize automated image processing technologies (e.g., contrast detection, contrast adjustment, color-to-greyscale conversion, grayscale-to-black-and-white conversion, pixel color or brightness analysis, adjacent pixel analysis, etc.) to automatically convert the original roof image(s) 204 into enhanced/processed roof image(s) 208. These enhanced/processed roof image(s) 208 may then be provided to the feature extractor 128, which analyzes the image(s) to identify locations of features, highlight features, and/or mark features found within the images. It should be appreciated that the feature extractor 128 may operate on original roof image(s) 204 in addition to or in lieu of operating on enhanced/processed roof image(s) 208.

The image analysis system 120 may then employ a feature analyzer 132 to automatically analyze the extracted features 212 to develop a feature list 216. In some embodiments, the feature analyzer 132 may develop a feature list 216 that may include a textual description of features and their locations (relative to one another and/or relative to a fixed point on the property system 112). The feature list 216 may further include a description of the type, size, and shape of each feature in the extracted features 212. These features may correspond to locations where potential damage is visible on the property system 112. As an example, extracted features 212 may correspond to identified locations in the original roof image that exhibit a visual similarity to damage shingles, gutters, vents, windows, siding, bricks, or other materials. This damage may be visible and identifiable via the image processing and feature extraction processes described herein. The feature analyzer 132 may format the feature list 216 in such a way that the feature list 216 is deliverable to an automated settlement engine 116.

Figure 3:
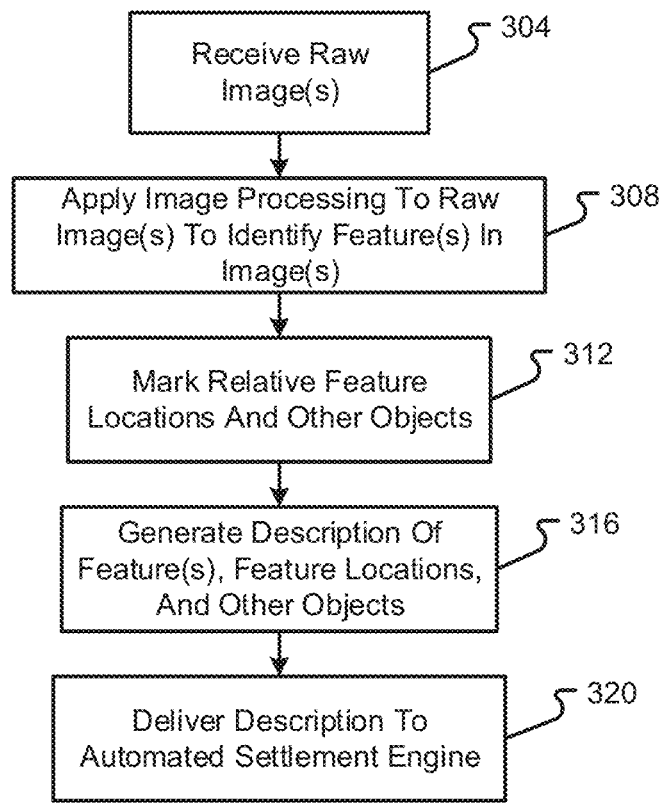
FIG. 3 is a flowchart illustrating an exemplary method of generate a description of features in accordance with embodiments described herein.

FIG. 3 shows a method in accordance with one embodiment that may be employed to generate the feature list 216. In particular, raw roof images may be received (step 304) and then have image processing applied thereto by the image analysis system 120 (step 308). Thereafter, the features found within the image(s) may be automatically marked and their locations identified (whether relative to other features or a specific object included in the image, e.g., a coin, dollar bill, roof corner, roof peak, etc.) (step 312). The feature analyzer 132 may then automatically generate a description of the features (e.g., shape, size, etc.) along with the feature locations and identification of other objects (e.g., non-roof objects) (step 316). This description can then be delivered (presumably as a feature list 216) to the automated settlement engine 116 for further processing as described herein (step 320).

In some embodiments, the automated settlement engine 116 includes an image analysis system API 136 that provides an interface for the image analysis system 120. The API 136 may define rules for delivering the feature list 216 (e.g., data structure, file format, maximum characters per entry, location definition requirements, etc.). The image analysis system API 136 may provide the conduit through which the feature list 216 is delivered to the automated settlement engine 116.

Figure 4:
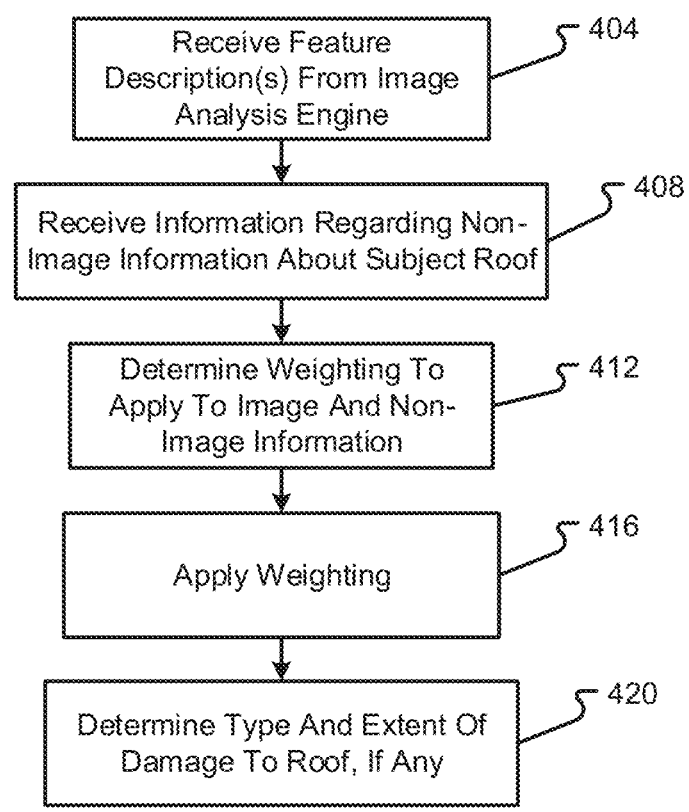
FIG. 4 is a flowchart illustrating an exemplary method of applying weighting and determining types and extents of damage to roofs in accordance with embodiments described herein.

As shown in FIG. 4, once the feature list 216 is received at the automated settlement engine 116 (step 404), the automate settlement engine 116 may begin employing its other components to analyze the overall damage to the roof to determine, in an automated or semi-automated fashion, whether the damage corresponds to hail or some other type of damage that occurred naturally and it, therefore, subject to insurance coverage and reimbursement.

The automated settlement engine 116 may include a set of insurance carrier-specific guidelines 140 that are used to define how the automated settlement engine 116 operates on a specific set or subset of images. More specifically, if the images are from a property system 112 insured by insurance carrier A, then a first set of rules may be applied to the analysis of the images where if the images are from a property system 112 insured by insurance carrier B, then a second set of rules may be applied to the analysis of the images (assuming there is a difference between insurance carrier A and carrier B's guidelines 140).

The automated settlement engine 116 may also include image analysis rules 144 and rules for analyzing non-image information 148. Finally, the automated settlement engine 116 may include a weighting engine 152 and reporting engine 156.

Thus, to complete the processing depicted in FIG. 4, the method continues with the automated settlement engine 116 receiving information regarding non-image objects (step 408). This type of information can include a description of non-roof objects (e.g., gutters, siding, fencing, trees, etc.) that help describe the environment surrounding the property system 112. The roof images may then be analyzed using the image analysis rules 144. In particular, the image analysis rules 144 may analyze the locations of features from the images to see if there is a random, non-random, or ordered characteristic to their distribution. The image analysis rules 144 may also analyze whether or not the entirety of the property system 112 was subjected to damage (e.g., has features located thereon) or whether only a subset of the property system 112 has been subjected to damage. As an example, only North or West facing roof portions may have been subjected to damage whereas the South and East facing roof portions were not. Hail damage is also usually associated with random or non-ordered locations of damage within a damage area. If the image analysis rules 144 identify an order or pattern to the damage or locations of features, then it may be determined that actual hail damage did not occur and is, therefore, not subject to insurance coverage. In some embodiments, an elevation inspection may be automatically performed prior to a roof inspection. On the elevation inspection, analysis may include an inspection for damage and non-damage to items that are commonly damaged by hail. These items, in some embodiments, may correspond to items constructed of soft metals, plastics, and fiberglass. Examples of such items/objects include, without limitation, gutters, downspouts, window screens, dryer vents, AC fins, etc. It is rare to find damage to the roof shingles without finding supporting evidence on the elevations. On the roof, soft metals and plastic vents should also show damage. Lack of such damage may provide an indication of non-hail damage to the property system 112.

The image analysis rules 144 applied by the automated settlement engine 116 may depend upon the carrier-specific guidelines 140 being employed. The application of non-image analysis rules 148 may also depend upon the carrier-specific guidelines 140. Analysis of the different aspects of images and non-image information may then be weighted according to a weighting engine 152. In some embodiments, a weighting is determined based on the carrier-specific guidelines 140 (step 412) and the determined weighting is applied by the weighting engine 152 (step 416). The different factors that can be weighted differently depending upon carrier-specific guidelines 140 include, without limitation, number of features/hail strikes identified within a predetermined area, size of features/hail strikes, shapes of features/hail strikes, relative locations of features/hail strikes, total extent of overall hail damage to roof, environmental/non-roof damage (e.g., tree damage, siding damage, gutter damage, etc.), age of roof, roofing material, age of house, reported damage of surrounding houses, etc. The applied weighting can be used to develop a probability score as to whether or not the roof actually experienced hail damage in a particular location or along its entirety (step 420). Embodiments of the present disclosure could also weigh these factors (e.g., video/still image information along with additional information not obtained from video and/or still images). This information can then be included in a report generated by a reporting engine 156 that is delivered to the insured, the insurance carrier, and/or an operator of the automated settlement engine 116 and/or image analysis system 120.

Figure 5:
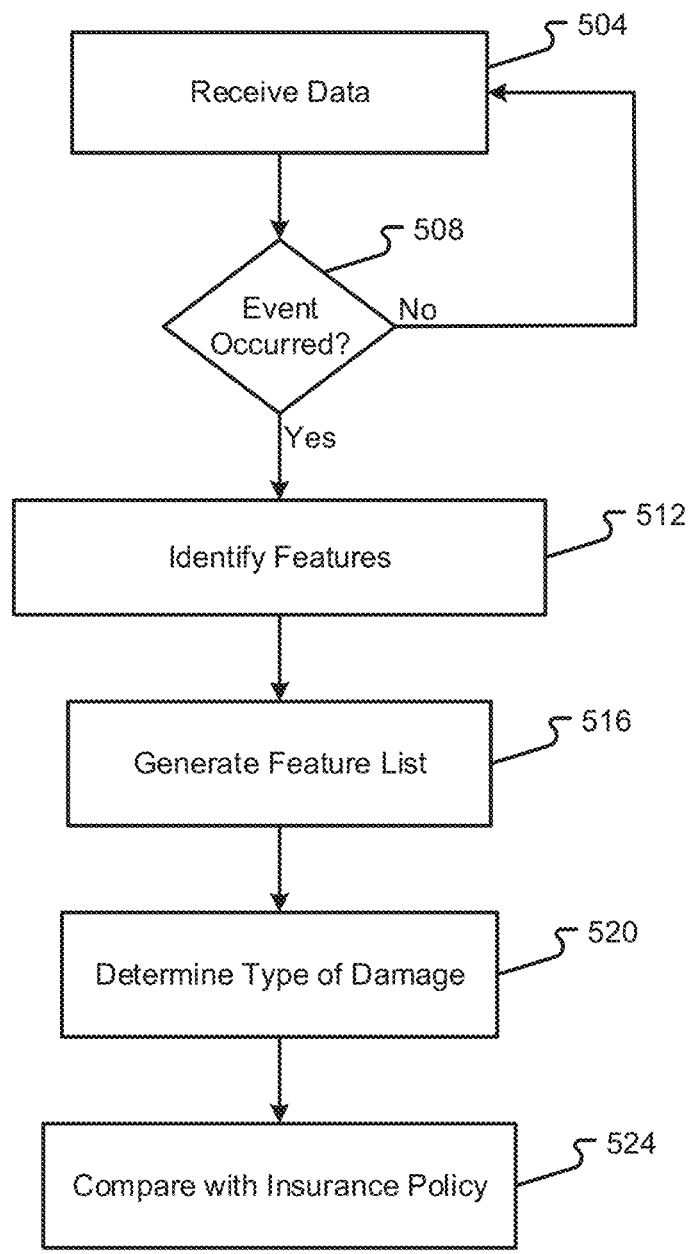
FIG. 5 is a flowchart illustrating an exemplary method of automatically identifying covered property damage in accordance with embodiments described herein.

As illustrated in FIG. 5, a method of automatically identifying damage may be achieved with the systems described herein. Such a method may begin in step 504 with an AI system receiving data from a property system. As described herein, data may be received from a property system from a number of sources. For example, sensor data may be transmitted via a communication network 104, data may be input into a user device 160, photographs and/or videos may be taken by a camera or drone 108, or other sources.

Using any received data, an AI system may determine whether an event occurred in step 508. An event may be the occurrence of damage to any property within a property system 112, or may be a natural disaster such as an earthquake, high winds, heavy rain, hail, etc. For example, moisture sensors in an attic may indicate a leak has occurred, pressure sensors on a roof may indicate hail has occurred, etc.

If the AI system determines no event and/or damage has occurred in step 508, the method may comprise retuning to step 504 and continuing to receive and/or wait for data related to the property system. If, on the other hand, the AI system determines an event and/or damage has occurred in step 508, the method may comprise proceeding to step 512 in which features of the property system associated with the event and/or damage may be identified by the AI system.

In some embodiments, the AI system may additionally prompt a user to provide additional information. For example, the AI system may determine a possibility of damage and may send a request to a user device for a user to input data related to the possibility of damage. The request may be in the form of a series of prompts and/or questions to guide a user through a process of collecting data.

In step 516, the AI system may compile the features identified in step 512 and may generate a list of features associated with the event detected in step 508.

In some embodiments, the AI system may compare the generated feature list with one or more previous feature lists to identify duplicate objects listed in the present feature list. Such a step may enable the AI system to verify no damage will be covered twice by an insurance carrier.

In step 520, the AI system may determine a type of damage for each feature in the list of features generated in step 516. For example, the list may be updated to include an indication of damage and/or an indication of a possibility of damage for each features. Indications of possibility of damage may further include a rating related to a degree of certainty for the possibility of damage.

In some embodiments, the AI system may determine a cause and/or origin of the damage for each of the features. For example, the AI system may review all of the damage together and identify a likely cause of the damage in light of the damage to all features. For example, if all of the damage is to features within a single room the AI system may determine the damage is contained within the room. Similarly, if all the damage is in the basement and the damage is all related to water damage, the AI system may determine the cause of the damage is likely a leak in the basement.

In some embodiments, the AI system may determine one or more features not listed in the list which may be damaged based on the damage listed in the list. For example, the AI system may be capable of identifying features associated with other features and which are often damaged when other features are damaged. Any features not currently listed but which may be damaged may be identified by the AI system and may be used to instruct users to provide additional data related to the damage.

In step 524, the AI system may compare the feature list and the type of damage as determined by the AI system with one or more insurance policies related to the property system. For example, the AI system may determine which feature in the feature list is covered by insurance and may determine whether the type of damage to each feature is of the type covered by an active insurance policy.

In some embodiments, the AI system may prompt a user with questions related to additional information needed by an insurance carrier. For example, a user may be prompted with a series of questions targeted to determining whether an insurance claim was fraudulently made. For example, the user posed with questions may be an onsite adjuster and/or inspector and the questions may be related to claims and/or statements made by the property owner. The questions may assist the adjuster and/or inspector to verify such claims and/or statements.

As extensions to the above-described solutions, embodiments of the present disclosure contemplate the following. When there is damage to the roof that the system determines is not hail, it may be possible to provide a probability of what the non-hail damage corresponds to. For example, organic shingles are manufactured with paper instead of fiberglass, so over time they are prone to blister popping (spots of granule loss) due to getting wet and the moisture evaporating and popping granules off. Additionally, the south slope wears out the fastest due to the extra sun it receives. In some embodiments, hail damage probability could be expanded to all types of roof damage (wind, blister popping, nail pops, mechanical damage, etc.) It should also be appreciated that embodiments of the present disclosure also include solutions where an inspector manually inspects the roof and takes photos for review, as opposed to an automated device such as a drone.

Figure 6:
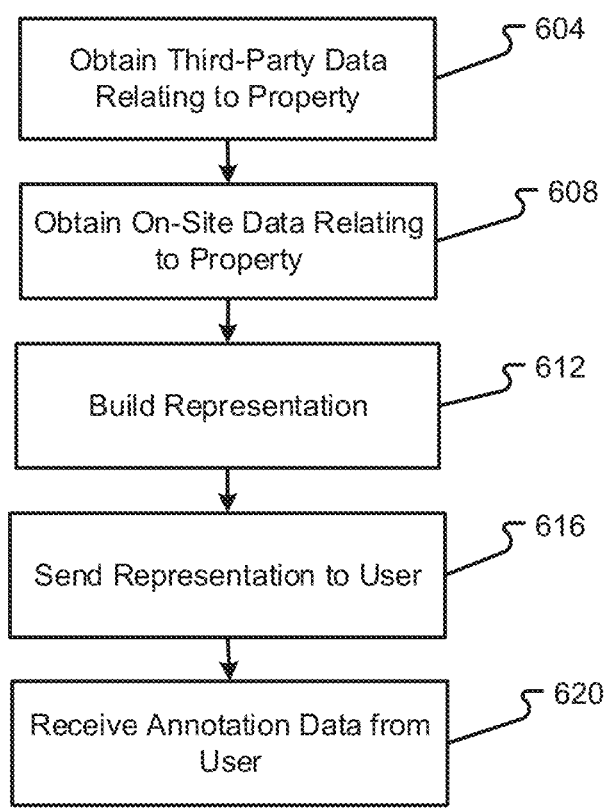
FIG. 6 is a flowchart illustrating an exemplary method of generating a representation of a property in accordance with embodiments described herein.

As illustrated in FIG. 6, a method of generating a visual representation of a property which may be used to improve the process of creating an estimate or scope of repair for the property may be achieved with the systems described herein. Such a method may begin in step 604 in which third party data relating to an insured property may be obtained by a computer system. Such a method may be executed by one or more of an image analysis system 120, an automated settlement engine 116, a server or other computer device, or some combination thereof. The system executing the method may be in communication with one or more users of user devices 160 via a communication network 104 as illustrated in FIG. 1.

In step 604, third party data may be obtained. For example, flyover image data may be obtained from a third party provider such as Eagle View™ or directly from a plane, satellite, drone 108, etc. Flyover image data may enable the determination by the system of dimensional data for a roof of the property or other aspects, such as roof face data to be compiled for the roof of the property. In some embodiments, third party data may be associated with walls of a property, physical surroundings of the property, interior aspects of the property, or any other physical aspects of the property.

In some embodiments, data received by the third party may be analyzed by the system executing the method. For example, each face of a given roof may be analyzed to determine a size, slope, direction, edge length, etc. Interior data may be analyzed to determine room size, ceiling height, etc.

In step 608, on-site data relating to the property may be obtained. In some embodiments, the system executing the method may be configured to determine whether a sufficient amount of data has been received from third party sources. If additional data is required, the system may instruct a user, such as an inspector, to gather additional data. The system may provide specific instructions to the user as to what information is needed and how to obtain the information. For example, a user may be instructed to take photographs of a property from particular angles to obtain the requisite data.

In this way, an inspector may be enabled by the system to add ground truth to the data obtained from third party sources. For example, roof images provided by a flyover device may not provide a full picture as to the material damage of the roof. Additional damage may be seen only from the location and not in the roof images. Inspectors may add additional information, such as shingle type, whether the roof has any vents, etc.

Often the primary issue in inspecting a damaged roof is whether to repair or replace the roof. The decision as to whether to repair or replace the roof may be decided based on a threshold. Also, a scope of repair must be written. To answer the question of whether to repair or replace the roof, and to prepare a scope of repair and/or an estimate, a great deal of information must be obtained. Further, it should be appreciated that the same or similar method may be applied in the same or similar way to the inspection of other parts of a building, such as an interior room or wall.

In some embodiments, data obtained in step 604 may be provided to a user in a beneficial manner to aid in the gathering of on-site data. For example, the system executing the method may be configured to divide up roof images into segments and/or cardinal directions. For example, a single image may be divided into ten foot by ten foot sections for each of North, South, East, West. Users may be enabled, using a device 160, to add descriptions such as curled, cracked, brittle, etc., to each section. In some embodiments, a user interface may show CAD facets, enabling a user to select a facet and add an annotation. Users may be enabled to add information such as whether there is a skylight, chimney, etc.

In some embodiments, users may collect photographs of a building. For example, an application executing on a user device may guide a user through a process of collecting photographs of different angles of a building. The application may be used to ensure that photographs from a sufficient number of angles of a building are obtained for a proper model or diagram of the building to be generated. In some embodiments, LiDAR or other similar technology may be used to gather data for generating a model or diagram.

Data may be collected and gathered as a set of x, y, and z coordinates to represent a three-dimensional object such as a building. A building may be represented as one or more point clouds. Each point cloud may comprise a set of data points. Each data point of a point cloud may comprise a set of x, y, and z coordinates and in some embodiments additional data. A plurality of photographs taken of a building or other object from various angles may be used to create one or more point clouds representing the building or other object.

In step 612, a representation of the property may be built based on the third party information as well as the on-site data. For example, the system executing the method may enable users to obtain three-dimensional models, images, CAD drawings, wireframe models, etc., of buildings or portions of buildings. In some embodiments, the system may be configured to obtain data from third party applications such as Hover™. Third party applications may be configured to accept one or more photographs from a user. The photographs may be taken from various angles of a building and may be used by the third party application or the system to generate a three-dimensional model, a CAD drawing, diagram, etc. of the building or a portion of the building. In some embodiments, the representation may be built prior to a user collecting photographs and may be updated based on additional material gathered through the process of photograph collecting.

In step 616, the representation of the property may be sent to a user device 160. The user device 160 may be operated by an on-site inspector, such as the inspector having taken the photographs in step 608. Once data relating to an object or building has been collected, a representation of the object or building has been created based on the data, and the representation has been sent to a user device, users may be enabled to add information relating to the represented object or building. For example, users may be capable of selecting a particular facet or side of the represented building or object and adding annotations. Information may include but is not limited to age and condition or other necessary details which may not be fully appreciated based on sight alone.

In step 620, annotation data entered by a user via a user device 160 may be sent from the user device 160 to the system executing the method. Information added to the representation may be used by the system to automatically determine whether all or any particular portion of the object or building represented by the representation should be repaired or replaced. In some embodiments, depreciation of the building or object may also be determined. In some embodiments, a scope of repair may be created. A scope of repair may be in the form of an XML file or other file type.

An estimate may also be generated. Estimates may comprise a number of line items and may be generated based in part on carrier rules, guidelines, best practices, etc. Estimates may also contain images. For example, images collected from third party applications in step 604 or from on-site adjusters in step 608 may be included in an estimate. It should be appreciated that in some embodiments, an estimate may be generated without the insured property ever having been physically inspected. For example, step 608 may not be necessary to build an accurate representation of a building and no annotation data may be necessary to generate an accurate estimate.

An estimate based on the data gathered in the method may be generated in a variety of ways. Estimates may contain any number of line items. Information such as missing walls, doors, windows, in addition to information relating to wall materials and/or ceiling materials may be used to calculate wall square footage which may be used to estimate a cost of repair. Pricing for various materials often differ based on insurance carriers and location. For example, rules relating to flood claims often vary drastically between different insurance carriers and geographic locations. Building codes may be adjusted based on an address of an insured property. In some embodiments, weather data may be obtained and used to estimate damage to a property, whether the property has been physically assessed or not. It should be appreciated that an estimate created through the method of FIG. 6 may be of a simple nature or may be a vastly complex document. Upon an estimate being created, the method of FIG. 6 may end.

As can be seen from the above description, the systems and methods disclosed herein are useful for automating the process of determining whether or not hail damage has been inflicted upon a roof. Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. Persons of ordinary skill in the art will also understand that various embodiments described above may be used in combination with each other without departing from the scope of the present disclosure.

While illustrative embodiments of the disclosure have been described in detail herein, it is to be understood that the inventive concepts may be otherwise variously embodied and employed, and that the appended claims are intended to be construed to include such variations, except as limited by the prior art.

Moreover, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the description.

What is claimed is:

1. A system, comprising:
   a processor; and
   a memory coupled to the processor and comprising computer-readable program code that when executed by the processor causes the processor to perform operations comprising:
      gathering, using LiDAR, LiDAR data associated with a property;
      processing the LiDAR data using an artificial intelligence (AI) system to identify one or more locations of damage to the property based on the LiDAR data;
      generating, with the AI system, a feature list comprising a list of the one or more locations of damage to the property;
      receiving annotation data from a user device in response to the feature list, wherein the annotation data comprises information describing one or more features of the property and/or the LiDAR data; and
      in response to receiving the annotation data, generating a report comprising the annotation data and the evidence-list of the one or more locations of damage to the property.

2. The system of claim 1, wherein the operations further comprise using the LiDAR data to generate a model of the property.

3. The system of claim 2, wherein the operations further comprise:
   transmitting the model of the property to the user device, wherein the annotation data from the user device is received in response to the model; and
   generating an estimate scope of repair for the property based on the annotation data.

4. The system of claim 1, wherein the LiDAR data is collected from outside the property.

5. The system of claim 1, wherein the LiDAR data is collected from inside the property.

6. The system of claim 1, wherein the AI system comprises a feature extractor tool and analyzer tool, wherein the feature extractor is configured to identify features and corresponding locations of the identified features, and wherein the analyzer tool is configured to process information obtained by the feature extractor tool and output the list of the one or more locations of damage to the property.

7. The system of claim 1, wherein the feature list comprises a textual description of the one or more locations of damage.

8. The system of claim 1, wherein the operations further comprise determining, with the AI system, a type of damage for each of the one or more locations.

9. The system of claim 1, wherein the operations further comprise determining a location in the feature list is covered by insurance.

10. The system of claim 1, further comprising determining one or more of a cause and an origin of damage for each location in the feature list.

11. The system of claim 1, further comprising identifying a probable cause of damage for each location in the feature list.

12. The system of claim 1, further comprising determining one or more location not in the feature list may be damaged based on the one or more locations of damage to the property.

13. The system of claim 1, wherein the operations further comprise determining an event occurred based on the one or more locations of damage to the property.

14. The system of claim 1, wherein the LiDAR data is collected as a point cloud.

15. The system of claim 1, wherein the operations further comprise estimating physical attributes of the property based on the LiDAR data.

16. The system of claim 1, wherein the operations further comprise determining dimensional data for one or more of a roof of the property, interior aspects of the property, and exterior aspects of the property.

17. The system of claim 1, wherein the report includes a rating associated with a degree of certainty of an existence of the damage to the property.

18. The system of claim 1, wherein the operations further comprise using the annotation data to automatically determine whether all or a portion of the property should be repaired or replaced.

19. A method comprising:
performing operations as follows on a processor of a computing device:
gathering, using LiDAR, LiDAR data associated with a property;
processing the LiDAR data using an artificial intelligence (AI) system to identify one or more locations of damage to the property based on the LiDAR data;
generating, with the AI system, a feature list comprising a list of the one or more locations of damage to the property;
receiving annotation data from a user device in response to the feature list, wherein the annotation data comprises information describing one or more features of the property and/or the LiDAR data; and
in response to receiving the annotation data, generating a report comprising the annotation data and the list of the one or more locations of damage to the property.

20. A computer program product comprising:
a non-transitory computer readable storage medium having computer-readable program code embodied therewith, the computer-readable program code configured when executed by a processor to:
gather, using LiDAR, LiDAR data associated with a property;
process the LiDAR data using an artificial intelligence (AI) system to identify one or more locations of damage to the property based on the LiDAR data;
generate, with the AI system, a feature list comprising a list of the one or more locations of damage to the property;
receive annotation data from a user device in response to the feature list, wherein the annotation data comprises information describing one or more features of the property and/or the LiDAR data; and
in response to receiving the annotation data, generate a report comprising the annotation data and the list of the one or more locations of damage to the property.

* * * * *